United States Patent
Ueno et al.

(10) Patent No.: US 6,820,416 B2
(45) Date of Patent: Nov. 23, 2004

(54) EXHAUST EMISSION CONTROL SYSTEM FOR AN INTERNAL COMBUSTION ENGINE

(75) Inventors: Masaki Ueno, Saitama (JP); Shiro Takakura, Saitama (JP); Kei Machida, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/060,058

(22) Filed: Jan. 31, 2002

(65) Prior Publication Data

US 2002/0100274 A1 Aug. 1, 2002

(30) Foreign Application Priority Data

Feb. 1, 2001 (JP) ...................................... 2001-025328

(51) Int. Cl.[7] ................................................. F01N 3/00
(52) U.S. Cl. .............................. 60/288; 60/297; 60/324
(58) Field of Search ......................... 60/284, 278, 287, 60/288, 297, 311, 324

(56) References Cited

U.S. PATENT DOCUMENTS

| | | | | |
|---|---|---|---|---|
| 5,097,665 A | * | 3/1992 | Kammel ....................... | 60/288 |
| 5,396,764 A | * | 3/1995 | Rao et al. ..................... | 60/287 |
| 5,589,143 A | * | 12/1996 | Mori et al. .................... | 60/297 |
| 5,634,332 A | * | 6/1997 | Tanaka et al. ................. | 60/288 |
| 5,647,206 A | * | 7/1997 | Yamamoto et al. ............ | 60/297 |
| 5,761,902 A | * | 6/1998 | Usami et al. .................. | 60/288 |
| 5,946,906 A | * | 9/1999 | Akazaki et al. ................ | 60/297 |
| 5,956,947 A | * | 9/1999 | Tanaka et al. ................. | 60/297 |
| 6,012,284 A | * | 1/2000 | Tanaka et al. ................. | 60/297 |
| 6,286,306 B1 | * | 9/2001 | Takakura et al. .............. | 60/288 |

FOREIGN PATENT DOCUMENTS

JP            9-324621          12/1997

* cited by examiner

*Primary Examiner*—Tu M. Nguyen
(74) *Attorney, Agent, or Firm*—Arent Fox PLLC

(57) ABSTRACT

An exhaust emission control system for an internal combustion engine has an exhaust passage switching device for switching an exhaust gas flow path, an HC adsorbent material disposed within the main exhaust passage for adsorbing and releasing unburned constituents in exhaust gases, and a control device for controlling the switching device such that the exhaust gas flow path is switched to the main exhaust passage when the unburned constituents is adsorbed by the HC adsorbent material, that the exhaust gas flow path is switched to the bypass exhaust passage when the unburned constituents adsorbed by the HC adsorbent material is released from the HC adsorbent material, and that the exhaust gas flow path is switched to the main exhaust passage when the release of the unburned constituents from the HC adsorbent material is completed.

7 Claims, 4 Drawing Sheets

000# EXHAUST EMISSION CONTROL SYSTEM FOR AN INTERNAL COMBUSTION ENGINE

BACKGROUND OF THE INVENTION

1. Field of the Invention

The present invention relates to an exhaust emission control system of an internal combustion engine for cleaning exhaust gases discharged from the internal combustion engine by adsorbing unburned constituents included in the exhaust gases with an adsorbent material.

2. Description of the Related Art

An exhaust emission control system disclosed in Japanese Patent Unexamined Application Hei. 9-324621 is known as a conventional exhaust emission control system of this type. This exhaust emission control system has an adsorbing device for adsorbing hydrocarbons which are unburned constituents. This adsorbing device is disposed downstream of a three-way catalyst in an exhaust pipe, and provided in the adsorbing device are two exhaust passages which branch from each other in the vicinity of an entrance and join together in the vicinity of an exit of the adsorbing device. An adsorbent material is provided in one of the exhaust passages (hereinafter, referred to as an "adsorbent material side passage") which is adapted to adsorb hydrocarbons and to release the hydrocarbons so adsorbed thereto as temperature increases. Additionally, a switchable recirculation pipe for recirculating part of exhaust gas to an induction side of an engine is connected to the adsorbent material side passage downstream of the adsorbent material. Furthermore, a switching valve is provided where the adsorbent material side passage and the other exhaust passage (hereinafter, referred to as "the other passage") join together which is adapted to open one of the exhaust passages while closing the other thereof. This switching valve is driven to open the adsorbent material side passage when a vacuum is provided which is generated when the engine is in operation.

The switching valve of the adsorbing device keeps the other passage open before the engine is started. The switching valve is controlled to open the adsorbent material side passage once the engine is started, whereby exhaust gases which have not been cleaned by the three-way catalyst which has not yet been activated are allowed to flow into the adsorbent material side passage, and hydrocarbons included in the exhaust gases are adsorbed by the adsorbent material. The exhaust gases so cleaned by adsorbing the hydrocarbons to the adsorbent material are then discharged to the outside via an exhaust pipe connected to the exit of the adsorbing device.

Thereafter, when the three-way catalyst is activated, the switching valve then opens the other passage. As this occurs, the recirculation pipe connected to the adsorbent material side passage is also opened, whereby most of the exhaust gases which have been cleaned by the three-way catalyst are allowed to flow through the other passage for discharge to the outside, whereas part of the exhaust gases flows through the adsorbent material side passage. Then, when the adsorbent material is heated by the exhaust gases which flow through the adsorbent material side passage the hydrocarbons which are now adsorbed to the adsorbent material are then released from the adsorbent material for recirculation to the induction side of the engine via the recirculation pipe. Thereafter, when the hydrocarbons have been completely released from the adsorbent material the recirculation pipe is closed, whereby exhaust gases are then allowed to flow through only the other passage to be discharged to the outside.

Additionally, in this exhaust emission control system, the switching valve is controlled as follows in order to remove from the adsorbent material deposits such as soot which are deposited to the adsorbent material while hydrocarbons are adsorbed and/or released. Namely, the switching valve is controlled to open the adsorbent material side passage when a fuel cut is executed while the engine is in operation or when the engine is in deceleration with the air-fuel ratio of exhaust gas being in lean conditions even while fuel is being supplied, whereby exhaust gases containing therein much oxygen are allowed to flow into the adsorbent material side passage so as to promote the combustion of deposits deposited in the adsorbent material to thereby remove the deposits from the adsorbent material. Thus, the recovery of the adsorbing performance of the adsorbent material and improvement of the durability thereof are attempted to be attained by removing the deposits from the adsorbent material.

As has been described above, in the conventional exhaust emission control system, the special control is required that the switching valve is driven when the predetermined conditions are established such as the fuel cut while the engine is in operation in order to remove the deposits from the adsorbent material. Moreover, since the driving of the switching valve occurs frequently while the engine is in operation, the durability of the switching vale and hence the exhaust emission control system becomes deteriorated. In addition, since the switching valve is driven by a vacuum generated by the operation of the engine, it is not possible to drive the switching valve which closes the adsorbent material side passage before the engine is started. To cope with this, in order for exhaust gases initially generated when the engine is started to be allowed to flow into the adsorbent material side passage, the switching valve needs to be controlled to be operated by estimating timing at which the switching valve is driven from the layout of the adsorbing device.

SUMMARY OF THE INVENTION

It is an object of the invention to provide an exhaust emission control system which can ensure that deposits in an adsorbent material are removed and also can improve the durability thereof without implementing any special control for switching a flow path of exhaust gases.

According to an aspect of the invention, there is provided an exhaust emission control system for an internal combustion engine provided along an exhaust system 2 having a main exhaust passage 13 connected to an internal combustion engine 1 and a bypass exhaust passage 14 which branches off and joins back to the main exhaust passage 13 for cleaning exhaust gases discharged from the internal combustion engine, the exhaust emission control system comprising 5 a switching device (an exhaust passage switching device 9 in an embodiment (hereinafter, referred to as the same when discussions are made as to the aspect of the invention)) for switching an exhaust gas flow path to either of the main exhaust passage and the bypass exhaust passage, an adsorbent material of zeolite (an HC adsorbent material 16) disposed within the main exhaust passage for adsorbing unburned constituents present in exhaust gases introduced into the main exhaust passage and releasing the unburned constituents so adsorbed as temperature increases, and a control device (an ECU 21) for controlling the switching device such that the exhaust gas flow path is switched to the main exhaust passage when the unburned constituents in the exhaust gases are allowed to be adsorbed by the adsorbent material, that the exhaust gas flow path is switched to the bypass exhaust passage when the unburned constituents so adsorbed by the adsorbent material are allowed to be released from said adsorbent material, and that the exhaust gas flow path is switched to the main exhaust passage when the release of the unburned constituents from the adsorbent material is completed.

According to the construction, the switching device is controlled such that the exhaust gas flow path is switched to the main exhaust passage when the unburned constituents in the exhaust gases are allowed to be adsorbed by the adsorbent material disposed within the main exhaust passage, that the exhaust gas flow path is switched to the bypass exhaust passage when the unburned constituents so adsorbed by the adsorbent material are allowed to be released from the adsorbent material, and that the exhaust gas flow path is switched to the main exhaust passage when the release of the unburned constituents from the adsorbent material is completed. Thus, when a catalyst normally provided along the exhaust system is still in inactivation, as in a case, for example, where the internal combustion engine has just been started, the exhaust gas flow path is switched to the main exhaust passage so that the exhaust gases containing the unburned constituents which have not yet been cleaned by the catalyst are allowed to flow into the main exhaust passage, whereby the unburned constituents in the exhaust gases are allowed to be adsorbed by the adsorbent material. Thereafter, when the catalyst is so activated that the unburned constituents in the exhaust gases can be cleaned, the exhaust gas flow path is then switched to the bypass exhaust passage so that the exhaust gases which have been cleaned by the catalyst are allowed to flow into the bypass exhaust passage and the unburned constituents adsorbed to the adsorbent material are allowed to be released from the adsorbent material. Then, the exhaust gas flow path is switched to the main exhaust passage after the release of the unburned constituents from the adsorbent material has been completed.

Thus, since the exhaust gas flow path is switched to the main exhaust passage all the time except while the unburned constituents are allowed to be released from the adsorbent material, i.e., almost all the time while the internal combustion engine is in operation, so that the exhaust gases are allowed to flow through the main exhaust passage, even if deposits such as soot are deposited in the adsorbent material when the exhaust gases pass through the adsorbent material, the adsorbent material is put in a highly heated state by the highly heated exhaust gases which flows through the main exhaust passage, and the deposits are burned with oxygen left unused in the exhaust gases due to fuel cuts taking place while the internal combustion engine is in operation, whereby the deposits can be removed from the adsorbent material. In addition, deposits comprising organic substances such as oil constituents deposited in the HC adsorbent material can be removed from the adsorbent material by heating the oil constituents themselves to a high temperature so that they are evaporated. Thus, the removal of the deposits can be ensured without any special control for switching the exhaust gas flow path, and as a result, it can be ensured that the clogging of the adsorbent material due to the deposits is prevented. In addition, the frequency at which the switching device performs the switching operation can remarkably be reduced by allowing the switching device to switch the exhaust gas flow path only when the unburned constituents are allowed to be released from the adsorbent material. As a result, the durability of the system can be improved. Furthermore, since the adsorbent material comprises zeolite which has superior thermal resistance, even if the exhaust gases flow through the main exhaust passage almost all the time when the internal combustion engine is in operation, there is no risk that the adsorbing performance of the adsorbent material is deteriorated.

In this case, preferably the bypass exhaust passage has an annular passage portion adapted to surround in an annular fashion a portion of the main exhaust passage where the adsorbent material is disposed.

According to the construction, when the exhaust gas flow path is switched to the bypass exhaust passage when the unburned constituents are allowed to be released from the adsorbent material, the exhaust gases are allowed to flow into the annular passage portion of the bypass exhaust passage. Since this annular passage portion surrounds the portion of the main exhaust passage where the adsorbent material is disposed, the adsorbent material can be heated by the exhaust gases flowing through the annular passage portion, whereby the adsorbent material can be heated quickly and easily to a temperature high enough to allow the unburned constituents to be released from the adsorbent material.

In addition, in this case, preferably the switching device has a switching valve element 15a adapted to freely move between an open position where the main exhaust passage is opened whereas the bypass exhaust passage is closed and a closed position where the main exhaust passage is closed whereas the bypass exhaust passage is opened, a biasing device (a torsion coil spring) for biasing the switching valve element to the open position, and an actuator 19 for driving the switching valve element from the open position to the closed position against the biasing device.

According to the construction, since the switching valve element adapted to freely move between the open position and the closed position is biased to the open position by the biasing device, the switching valve element only has to be driven from the open position to the closed position against the biasing device by the actuator. Namely, since the actuator does not have to be activated all the time except while the unburned constituents are allowed to be released from the absorbing material, i.e., almost all the time when the internal combustion engine is in operation, the amount of power to be consumed to operate the actuator can be reduced to a minimum level, and the reliability with which the exhaust gas flow path is switched over can be maintained high. In addition, even if the actuator is adapted to operate in conjunction with the operation of the internal combustion engine, since the exhaust gas flow path is adapted to be switched to the main exhaust passage at all times, as is different from the conventional example, there is no need to allow for timing at which the switching valve element is driven when the internal combustion engine is started.

In this case, the switching device further has a rotational shaft 15c adapted to be driven to rotate by the actuator, and an arm 15b connected between the switching valve element and the rotational shaft for driving the switching valve element in conjunction with the rotation of the rotational shaft, wherein preferably the rotational shaft and the arm are disposed in the bypass exhaust passage.

According to the construction, since the rotational shaft and the arm of the switching valve are disposed on the bypass exhaust passage side where there exists little exhaust gas flowing while the internal combustion engine is in operation, the deterioration of the rotational shaft and the arm through exposure to the exhaust gases can be suppressed, whereby the durability of the rotational shaft and the arm can be improved.

DESCRIPTION OF THE PREFERRED EMBODIMENTS

Figure 1:
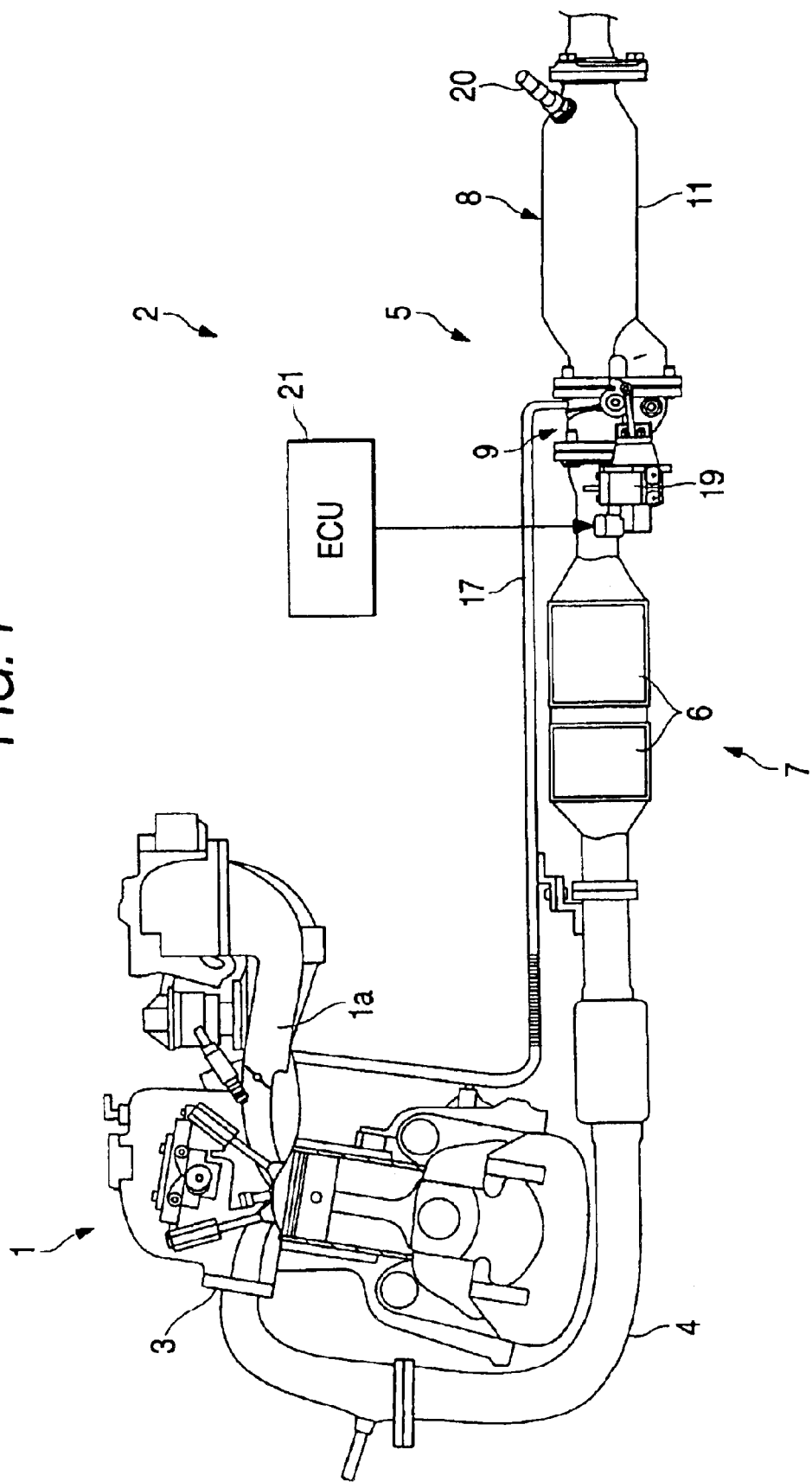
FIG. 1 is a view showing the construction of an internal combustion engine to which an exhaust emission control system according to the invention is applied.

A preferred mode for carrying out the invention will be described in detail below with reference to the accompanying drawings. FIG. 1 shows an internal combustion engine to which an exhaust emission control system according to one embodiment of the invention is applied. As shown in the same figure, an exhaust system 2 of this internal combustion engine (hereinafter, referred to as an "engine") 1 is adapted to discharge exhaust gases discharged from the engine 1 to the outside (the atmosphere) while cleaning the same and to recirculate part of the exhaust gases so discharged to the engine 1 (EGR) and has an exhaust pipe 4 connected to the engine 1 via an exhaust manifold 3.

An exhaust emission control system 5 is provided at an intermediate position along the length of the exhaust pipe 4 and comprises a catalytic converter 7 having two three-way catalysts 6, 6 and an HC adsorbing device 8 for adsorbing and processing hydrocarbons (HC) which are unburned constituents in exhaust gases. The two three-way catalysts 6, 6 of the catalytic converter 7 are disposed adjacent to each other along the exhaust pipe 4, and these catalysts are activated when they are heated to reach or exceed a predetermined temperature (for example, 300 degrees C.), whereby noxious substances (hydrocarbon, carbon monoxide and nitrogen compound) included in exhaust gases passing through the catalytic converter 7 are cleaned through reduction-oxidation operations.

Figure 2:
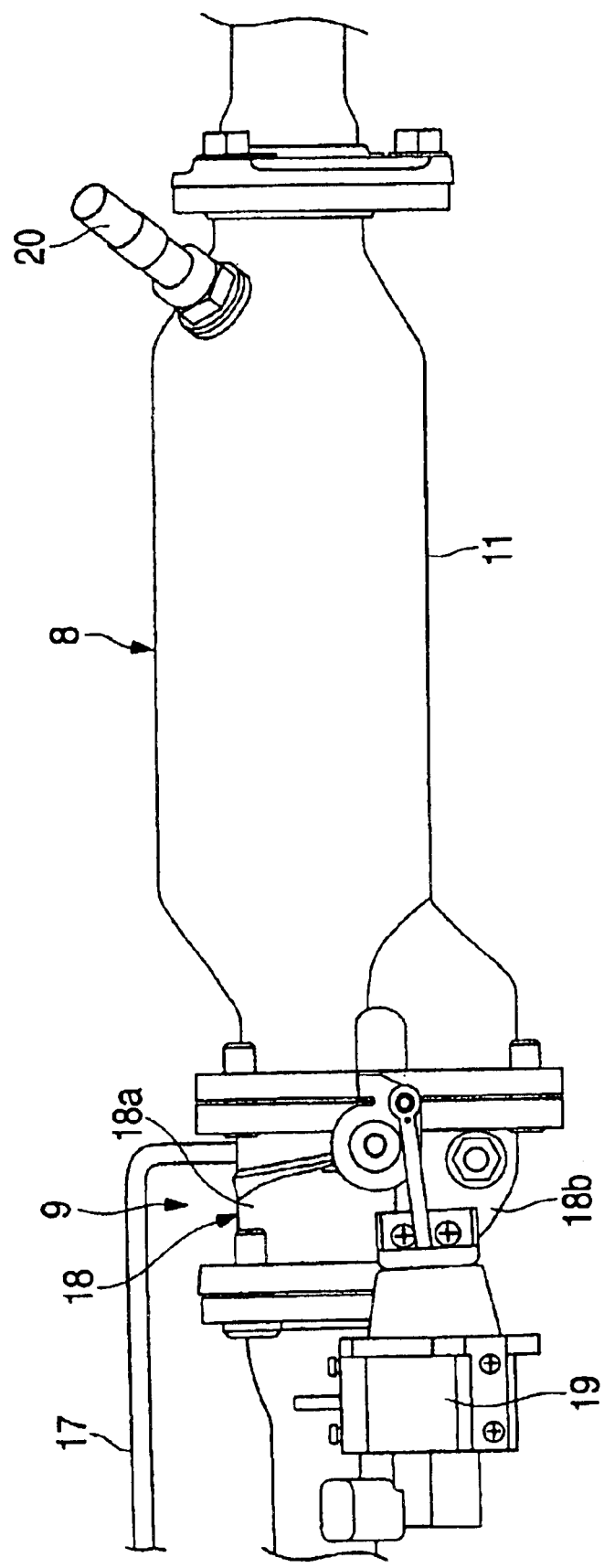
FIG. 2 is an enlarged side view showing a portion of the exhaust emission control system which is situated in the vicinity of where an HC adsorbing device is provided.
Figure 3:
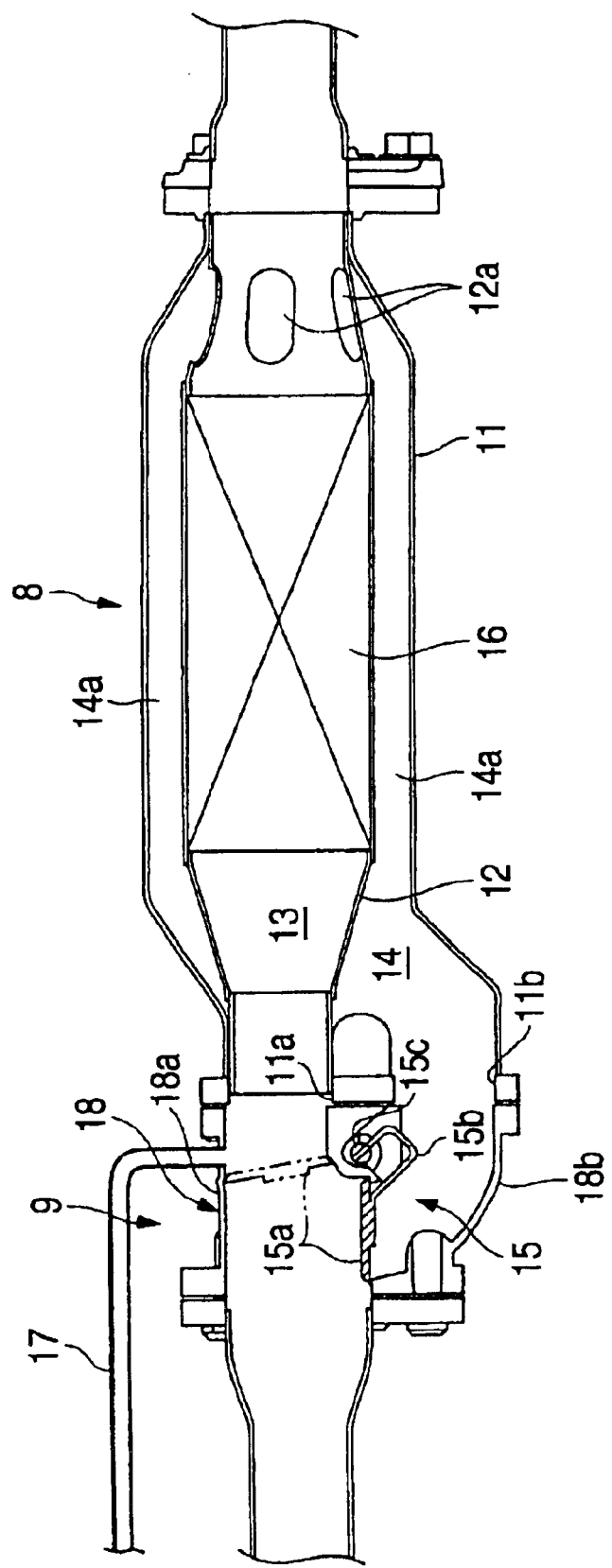
FIG. 3 is a cross-sectional view of the portion situated in the vicinity of where the HC adsorbing device is provided which is shown in FIG. 2.

The HC adsorbing device 8 is disposed downstream of the catalytic converter 7 in the exhaust pipe 4 for adsorbing hydrocarbons in exhaust gases within a certain period of time from the start of the engine 1 (for example, within 30 to 40 seconds from the start of the engine) with the three-way catalysts 6, 6 being not activated, so that the amount of hydrocarbons included in exhaust gases to be discharged to the outside is remarkably reduced. As shown in FIGS. 1 to 3, the HC adsorbing device 8 is connected to a downstream end portion of the catalytic converter 7 via an exhaust passage switching device 9 (a switching device) and comprises a case 11 constituting a substantially cylindrical shell, a main exhaust pipe 12 disposed in the interior of the case 11, and a cylindrical HC adsorbent material 16 (an adsorbent material) loaded at an intermediate position along the length of the main exhaust pipe 12 for adsorbing hydrocarbons included in exhaust gases flowing into the main exhaust pipe 12.

As shown in FIGS. 2 and 3, the case 11 is vertically bifurcated at an upstream end portion thereof, and an upper opening 11a is allowed to communicate with an exhaust passage of the exhaust pipe 4 and an internal space (a main exhaust passage 13) of the main exhaust pipe 12 in the case 11. On the other hand, a lower opening 11b is allowed to communicate with a space (a bypass exhaust passage 14) having an annular cross section which is formed in such a manner as to surround the main exhaust pipe 12 in an annular fashion.

The main exhaust pipe 12 is connected airtightly to an inner surface of the upper opening 11a of the case 11 at the upstream end portion thereof and an inner surface of a downstream end portion of the case 11 at a downstream end portion thereof. In addition, a plurality of (for example, five) elongate hole-like communication holes 12a are formed at a position closer to the downstream end of the main exhaust pipe 12 in such a manner as to be disposed at equal intervals in a circumferential direction, and downstream end portions of the main exhaust passage 13 and the bypass exhaust passage 14 in the case 11 are allowed to communicate with each other via these communication holes 12a. On the other hand, as has been described above, the bypass exhaust passage 14 has the portion (an annular passage portion 14a) which surrounds the main exhaust pipe 12, and the HC adsorbent material 16 disposed in the main exhaust pipe 12 is constructed to be heated by exhaust gases when they flow through the annular passage portion 14a.

The HC adsorbent material 16 is constituted by a metallic honeycomb (not shown) carrying zeolite on a surface thereof, and when exhaust gases which flow into the main exhaust passage 13 pass through the interior of the HC adsorbent material 16 hydrocarbons included in the exhaust gases are then adsorbed by the zeolite. Zeolite has high thermal resistance and adsorbs hydrocarbons when it is at low temperatures (for example, less than 100 degrees C.) whereas zeolite releases the hydrocarbons which it has once adsorbed thereto when it is heated to reach or exceed a predetermined temperature (for example, 100 to 250 degrees C.). Then, the hydrocarbons so released are recirculated to the engine 1 via an EGR pipe 17 connected to a main pipe portion 18a of the exhaust passage switching device 9, which will be described later, and an induction pipe 1a of the engine at end portions thereof for combustion in the engine 1.

In addition, as has been described above, since the HC adsorbent material 16 is constituted by a-honeycomb, even if exhaust gases flow through the main exhaust passage 13 at almost all times while the engine 1 is in operation, there occurs no case where the exhaust resistance thereof constitutes a problem. In addition, while there is no special limitation to the kind of the zeolite used as long as it can adsorb hydrocarbons, in this embodiment, zeolites such as USY (Y Type), Ga-MFI and one mixed with ferrielite are used. Since the HC adsorbent material 16 composed of zeolite has superior thermal resistance, there is no risk that the adsorbing performance of the HC adsorbent material 16 is deteriorated even if exhaust gases pass through the HC adsorbent material 16 at almost all times while the engine 1 is in operation.

In addition, as shown in FIGS. 1 and 2, a humidity sensor 20 is mounted at the downstream end portion of the case 11. This humidity sensor 20 detects humidity of exhaust gases which have passed through the HC adsorbent material 16 and sends a detection signal to an ECU 21, which will be described later. This detection signal is used to determine the deterioration of the HC adsorbent material 16.

The exhaust passage switching device 9 couples the HC adsorbing device 8 constructed as described above to the catalytic converter 7 and is intended to switch the flow path of exhaust gases which have passed through the catalytic converter 7 to either of the main exhaust passage 13 and the bypass exhaust passage 14 depending upon the running conditions of the engine 1. The exhaust passage switching device 9 has a substantially cylindrical connecting pipe 18 and a switching valve 15 disposed within the connecting pipe 18 for switching the flow path of exhaust gases. The connecting pipe 18 is constituted by a main pipe portion 18a for connecting the downstream end portion of the catalytic converter 7 with the main exhaust passage 13 of the HC adsorbing device 8 in an airtight fashion and a branched pipe portion 18b which branches from the main pipe portion 18a at an upstream portion thereof for connecting the downstream end portion of the catalytic converter 7 with the bypass exhaust passage 14 of the HC adsorbing device 8 in an airtight fashion. In addition, one end portion of the EGR pipe 17 is connected to the main pipe portion 18a at a position downstream of a switching valve element 15a situated at a closed position of the switching valve 15, which will be described later.

Figure 4A:
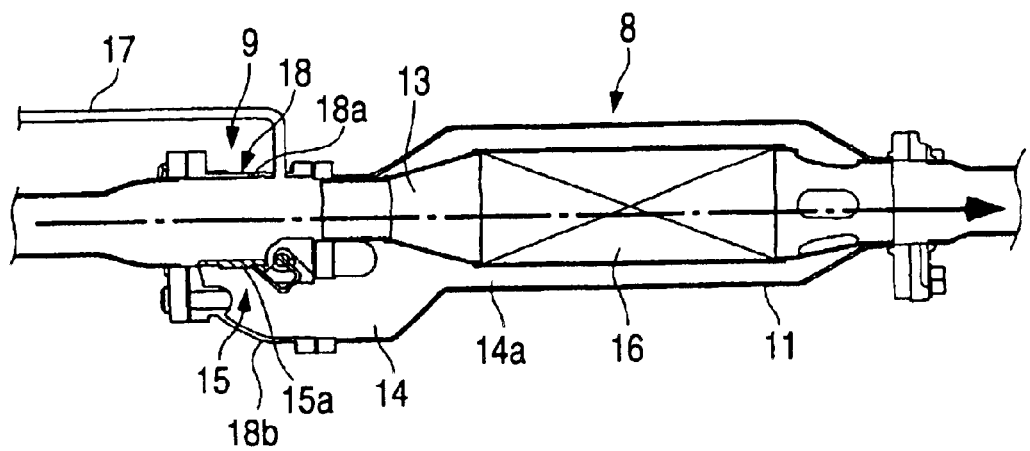
FIG. 4A is an explanatory view showing the switching of an exhaust gas flow path by a switching valve when a main exhaust passage is opened.

On the other hand, the switching valve 15 has a disc-like switching valve element 15a, an arm having a U-shaped side cross section for supporting the switching valve element 15a at one end portion thereof, a rotational shaft 15c to which the arm 15b is fixed at the other end portion thereof and a torsion coil spring (a biasing device), not shown, which is attached to the rotational shaft 15c for biasing the switching valve element 15a to an open position, which will be described later. The switching valve element 15a is constructed to rotate freely about the rotational shaft 15c between an open position (a position indicated by solid lines in FIG. 3 and shown in FIG. 4A) where the main pipe portion 18a is opened whereas the branched pipe portion 18b is closed and a closed position (a position indicated by two-dot chain lines in FIG. 3 and shown in FIG. 4B) where the main pipe portion 18a is closed whereas the branched pipe portion 18b is opened. In addition, as shown in FIG. 3, the arm 15b of the switching valve 15 is disposed such that the arm 15b is situated within the branched pipe portion 18b when the switching valve element 15a is situated at the open position as shown in FIG. 4A whereas the arm 15b is disposed such that a half portion on the switching valve element 15a side of the arm 15b is situated in the main pipe portion 18a. Furthermore, the rotational shaft 15c of the switching valve 15 is disposed so as to face the interior of the branched pipe portion 18b.

The switching valve 15 constructed as described above is driven by an actuator 19 which is controlled by the ECU 21, which will be described later. The actuator 19 is constructed to drive to rotate the rotational shaft 15c through a predetermined angle in a predetermined direction when a vacuum is supplied thereto. Consequently, in case no vacuum is supplied to the actuator 19, the switching valve element 15a is held at the open position by means of the torsion coil spring, not shown. On the contrary, when a vacuum is supplied to the actuator 19, the rotational shaft 15c is driven to rotate against the torsion coil spring, and the switching valve element 15a situated at the open position is then driven to rotate to the closed position. In addition, when the supply of vacuum to the actuator 19 is stopped, the switching valve element 15a is automatically restored to the open position by means of the torsion coil spring.

The ECU 21 is constituted by a microcomputer comprising an I/O interface, CPU, RAM and ROM. Detection signals from various sensors including the humidity sensor 20 are A/D converted at the I/O interface and thereafter are inputted into the CPU. The CPU responds to detection signals from the various sensors and detects the driving conditions of the engine 1 according to a control program stored in the ROM and controls, as will be described later, the switching of the exhaust gas flow path by the switching valve 15 according to the driving conditions so detected.

Note that no vacuum is supplied to the actuator 19 before the engine 1 is started, whereby the switching valve element 15a of the switching valve 15 is held at the open position by means of the torsion coil spring, not shown.

Since the three-way catalysts 6, 6 are normally at low temperatures and are hence in an inactivated state when the engine 1 is started, exhaust gases are not cleaned at the catalytic converter 7, and therefore exhaust gases containing hydrocarbons pass through the catalytic converter 7 as they are and continue to flow toward the HC adsorbing device 8. As this occurs, the switching valve element 15a of the switching valve 15 is maintained at the open position so that hydrocarbons in the exhaust gases are allowed to be adsorbed by the HC adsorbent material 16. Namely, even if the engine 1 is started, the switching valve element 15a is maintained at the open position with no vacuum being supplied to the actuator 19, whereby as indicated in alternate long and short dash lines in FIG. 4A, the exhaust gases containing hydrocarbons which have passed through the catalytic converter 7 pass through the main pipe portion 18a of the connecting pipe 18 to flow into the main exhaust passage 13 having therein the HC adsorbent material 16. Then, hydrocarbons in the exhaust gases are adsorbed by the HC adsorbent material 16, and the exhaust gases which have passed through the HC adsorbent material 16, i.e., the exhaust gases cleaned by removing hydrocarbons therefrom further flow downstream to be discharged to the outside.

Figure 4B:
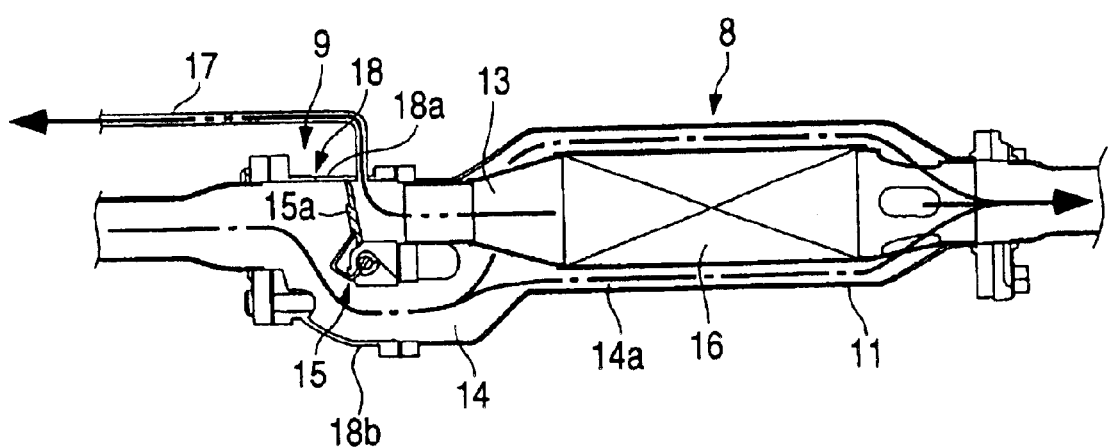
FIG. 4B is an explanatory view showing the switching of an exhaust gas flow path by a switching valve when the main exhaust passage is closed.

When the ECU determines that the hydrocarbons adsorbed to the HC adsorbent material 16 should be released for preparation for the following hydrocarbon adsorption after a predetermined time has elapsed after the engine 1 was started or when the activation of the three-way catalysts 6, 6 is detected by the various sensors, a vacuum is supplied to the actuator 19. Then, as shown in FIG. 4B, the switching valve element 15a situated at the open position is driven to rotate to the closed position against the torsion coil spring, not shown, whereby as indicated in alternate long and short dash lines in the same figure, the exhaust gases which have been cleaned when they have passed through the catalytic converter 7 pass through the branched pipe portion 18b of the connecting pipe 18 and flow into the bypass exhaust passage 14 surrounding the main exhaust pipe 12. Then, the exhaust gases flow into the main exhaust pipe 12 via the communication holes 12a formed in the downstream end portion of the main exhaust pipe 12 and continue to flow downstream to be discharged to the outside.

As this occurs, the HC adsorbent material 16 is heated by the exhaust gases which flow through the bypass exhaust passage 14 (the annular passage portion 14a) and the temperature of the HC adsorbent material is increased. Then, when the HC adsorbent material is heated to reach or exceed the predetermined temperature the hydrocarbons adsorbed to the HC adsorbent material 16 are allowed to be released therefrom. The hydrocarbons so released from the HC adsorbent material 16 are then recirculated to the induction pipe 1a via the EGR pipe 17 for combustion in the engine 1.

When the ECU 21 determines that the release of the adsorbed hydrocarbons should be completed after a predetermined time has elapsed after the exhaust gas recirculation or EGR has been executed or when the various sensors detects the completion of the release of the hydrocarbons from the HC adsorbent material 16, the supply of vacuum to the actuator 19 is stopped. Then, the switching valve element 15a situated at the closed position is automatically restored to the open position (refer to FIG. 4A) by means of the torsion coil spring. Thereafter, this condition continues, whereby the exhaust gases which have passed through the catalytic converter 7 are allowed to pass through the main exhaust passage 13 having therein the HC adsorbent material 16 to be discharged to the outside.

As has been described in detail heretofore, according to the exhaust emission control system 5 according to the embodiment of the invention, the exhaust gas flow path is normally maintained by the switching valve 15 in a state in which the exhaust gas flow path is switched to the main exhaust passage 13, whereas the exhaust gas flow path is switched by the switching valve 15 to the bypass exhaust passage 14 when the release from the HC adsorbent material 16 of the hydrocarbons adsorbed thereto is executed. Thus, since the exhaust gas flow path is switched to the main exhaust passage 13 all the time except while the unburned constituents adhered to the HC adsorbent material 16 are allowed to be released therefrom, i.e., almost all the time while the internal combustion engine is in operation, so that the exhaust gases are allowed to flow through the main exhaust passage 13, even if deposits such as soot are deposited in the HC adsorbent material 16 when the exhaust gases pass through the HC adsorbent material 16, the HC adsorbent material 16 is put in a highly heated state by the highly heated exhaust gases which flows through the main exhaust passage 13, and the deposits are burned with oxygen left unused in the exhaust gases due to fuel cuts taking place while the internal combustion engine is in operation, whereby the deposits can be removed from the HC adsorbent material 16. In addition, deposits comprising organic substances such as oil constituents deposited in the HC adsorbent material 16 can be removed therefrom by heating the oil constituents themselves to a high temperature so that they are evaporated. Thus, the removal of the deposits in the HC adsorbent material 16 can be ensured without any special control for switching the exhaust gas flow path, and as a result, it can be ensured that the clogging (or caulking) of the adsorbent material due to the deposits is prevented, whereby the adsorbing performance of the HC adsorbent material 16 can be maintained high. In addition, the frequency at which the switching valve 15 performs the switching operation can remarkably be reduced, when compared to the conventional exhaust emission control system, by allowing the switching valve 15 to operate only when the hydrocarbons are allowed to be released from the HC adsorbent material 16. As a result, the durability of the system can be improved.

In addition, since the annular passage portion 14a of the bypass exhaust passage 14 surrounds the HC adsorbent material 16 in the HC adsorbing device 8, when the release of hydrocarbons from the HC adsorbent material 16 is executed, the HC adsorbent material 16 can be heated quickly and easily to the temperature at which hydrocarbons are allowed to be released from the HC adsorbent material 16.

Furthermore, since the actuator 19 does not have to be actuated at all times except while hydrocarbons are allowed to be released from the HC adsorbent material 16, i.e., almost all the time when the engine 1 is in operation, the power consumption for the actuation of the actuator 19 can be reduced to the minimum level, and the highly reliable switching of the exhaust gas flow path can be maintained. In addition, since the exhaust gas flow path is kept switched to the main exhaust passage 13 at all times when the engine 1 is started, as being from the conventional exhaust emission control system, there is no need to consider timing at which the switching valve 15 is driven when the engine 1 is started.

Moreover, since the arm 15b and the rotational shaft 15c of the switching valve 15 are disposed on the bypass exhaust passage 14 side where there is flowing little exhaust gas while the engine 1 is in operation, the deterioration of the arm 15b and the rotational shaft 15c due to the exposure to exhaust gases can be suppressed to thereby improve the durability thereof.

Note that the invention is not limited to the embodiment that has been described heretofore, and any construction can be used as long as the HC adsorbent material is allowed to be in the exhaust passage where exhaust gases are allowed to flow at almost all times when the engine is in operation. Therefore, on the contrary to the embodiment described above, the HC adsorbent material may be disposed in the bypass exhaust passage 14, and the switching valve 15 may be controlled such that the switching valve element 15a is situated at the closed position at all times, whereas the switching valve element 15a is driven to the open position when the release of hydrocarbons is executed. Note that as this occurs, the EGR pipe 17 needs to be connected to the branched pipe portion 18b of the connecting pipe 18, and the biasing direction of the switching valve element 15a by the torsion coil spring also needs to be made opposite to that in the embodiment above. In addition, the detailed constructions of the HC adsorbing device 8 and the switching valve 15 described in the above embodiment are illustrated by way of examples, and therefore they can be modified as required without departing from the scope and sprit of the invention.

As has been described in detail heretofore, the exhaust emission control system according to the invention is advantageous in that it is ensured that deposits deposited in the adsorbent material can be removed therefrom and that the durability of the system can be improved without any special control for switching the exhaust gas flow path.

What is claimed is:

1. An exhaust emission control system of an internal combustion engine for cleaning exhaust gases discharged from the internal combustion engine comprising:
    an exhaust system defining a main exhaust passage connected to an internal combustion engine, and a bypass exhaust passage that branches off and joins back to the main exhaust passage;
    a switching device switching an exhaust gas flow path to either of the main exhaust passage and the bypass exhaust passage;
    an adsorbent material disposed within the main exhaust passage for adsorbing unburned constituents of exhaust gases introduced into the main exhaust passage and releasing the unburned constituents as temperature increases; and
    a control device operable to control the switching device, wherein the control device switches the exhaust gas flow path to the main exhaust passage when the adsorbent material adsorbs the unburned constituents, the control device switches the exhaust gas flow path to the bypass exhaust passage only to direct all of the exhaust gas flow through the bypass exhaust passage when the adsorbed unburned constituents is released from the adsorbent material, and the control device switches the exhaust gas flow path to the main exhaust passage when a release of the adsorbed unburned constituents is completed.

2. The exhaust emission control system according to claim 1, wherein the adsorbent material includes a zeolite.

3. The exhaust emission control system according to claim 1, wherein the switching device has a switching valve element adapted to freely move between an open position where the main exhaust passage is opened whereas the bypass exhaust passage is closed and a closed position where said main exhaust passage is closed whereas the bypass exhaust passage is opened, a biasing device for biasing the switching valve element to the open position, and an actuator for driving the switching valve element from the open position to the closed position against the biasing device.

4. The exhaust emission control system according to claim 3, wherein the switching device further comprises:

a rotational shaft adapted to be driven to rotate by the actuator; and an arm connected between the switching valve element and the rotational shaft for driving the switching valve element in conjunction with a rotation of the rotational shaft, wherein the rotational shaft and the arm are disposed in the bypass exhaust passage.

5. The exhaust emission control system for the internal combustion engine according to claim 1, wherein the exhaust system has the bypass exhaust passage including an annular passage portion surrounding in an annular fashion a portion of the main exhaust passage, on which the adsorbent material is disposed.

6. The exhaust emission control system according to claim 5, wherein the switching device has a switching valve element adapted to freely move between an open position where the main exhaust passage is opened whereas the bypass exhaust passage is closed and a closed position where said main exhaust passage is closed whereas the bypass exhaust passage is opened, a biasing device for biasing the switching valve element to the open position, and an actuator for driving the switching valve element from the open position to the closed position against the biasing device.

7. The exhaust emission control system according to claim 6, wherein the switching device further comprises:

a rotational shaft adapted to be driven to rotate by the actuator; and an arm connected between the switching valve element and the rotational shaft for driving the switching valve element in conjunction with a rotation of the rotational shaft, wherein the rotational shaft and the arm are disposed in the bypass exhaust passage.

\* \* \* \* \*